L. O. HALCOMB.
CORN HARVESTER.
APPLICATION FILED AUG. 11, 1915.
1,190,231.
Patented July 4, 1916.
3 SHEETS—SHEET 3.
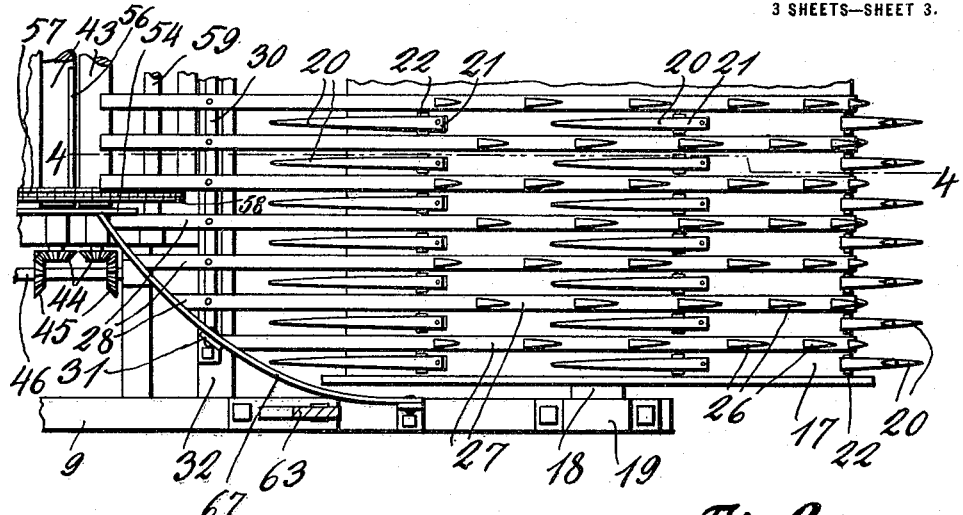
Fig. 3.
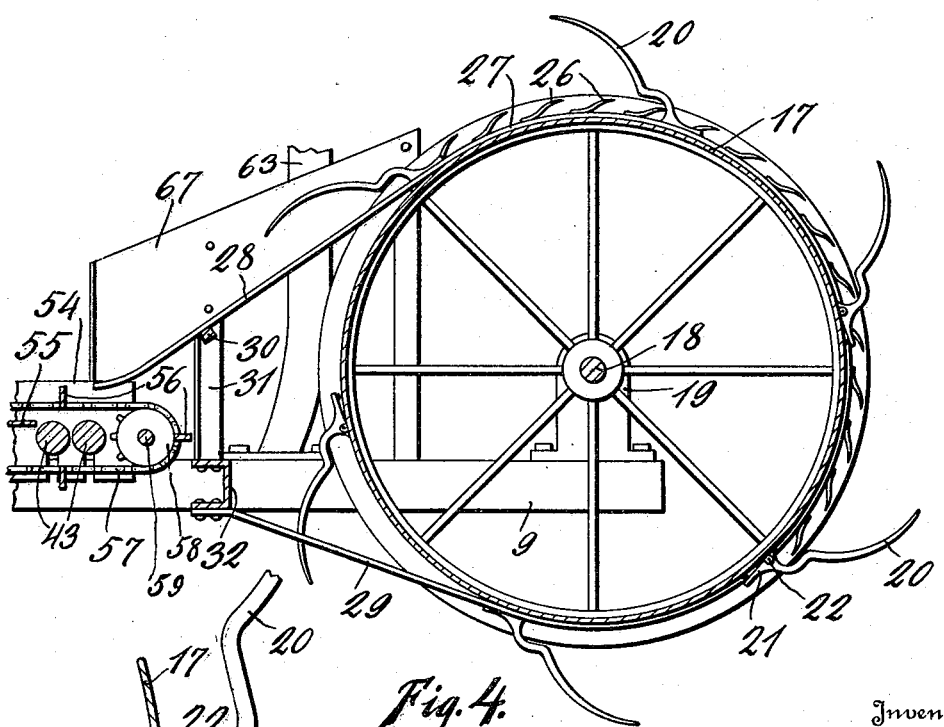
Fig. 4.
Fig. 5.
Inventor
Lee O. Halcomb

UNITED STATES PATENT OFFICE.

LEE O. HALCOMB, OF INDIANAPOLIS, INDIANA.

CORN-HARVESTER.

1,190,231.  Specification of Letters Patent.  Patented July 4, 1916.

Application filed August 11, 1915. Serial No. 44,949.

*To all whom it may concern:*

Be it known that I, LEE O. HALCOMB, a citizen of the United States, residing at Indianapolis, in the county of Marion and State of Indiana, have invented certain new and useful Improvements in Corn-Harvesters, of which the following is a specification.

This invention relates to machines for harvesting corn by removing the ears from the stalks standing in the field.

The invention has for its object to provide an efficient corn harvester of the type specified, characterized by a novel and improved means for stripping the ears from the stalks and also tearing the husks to facilitate the removal of the latter from the ears, and to this end, the invention consists in a combination and arrangement of parts to be hereinafter described and claimed.

In order that the invention may be better understood, reference is had to the accompanying drawings, in which—

Figure 1:
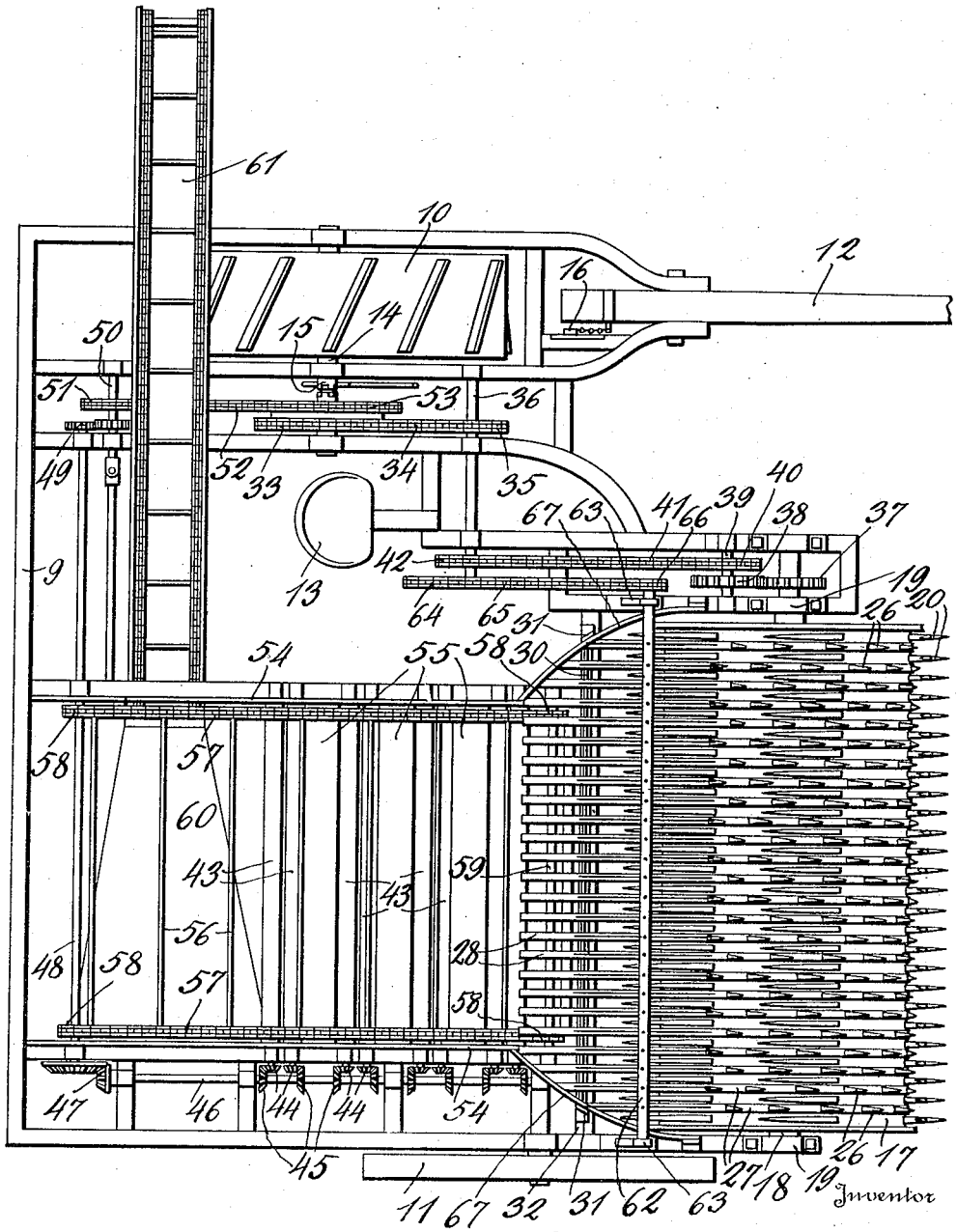
Figure 2:
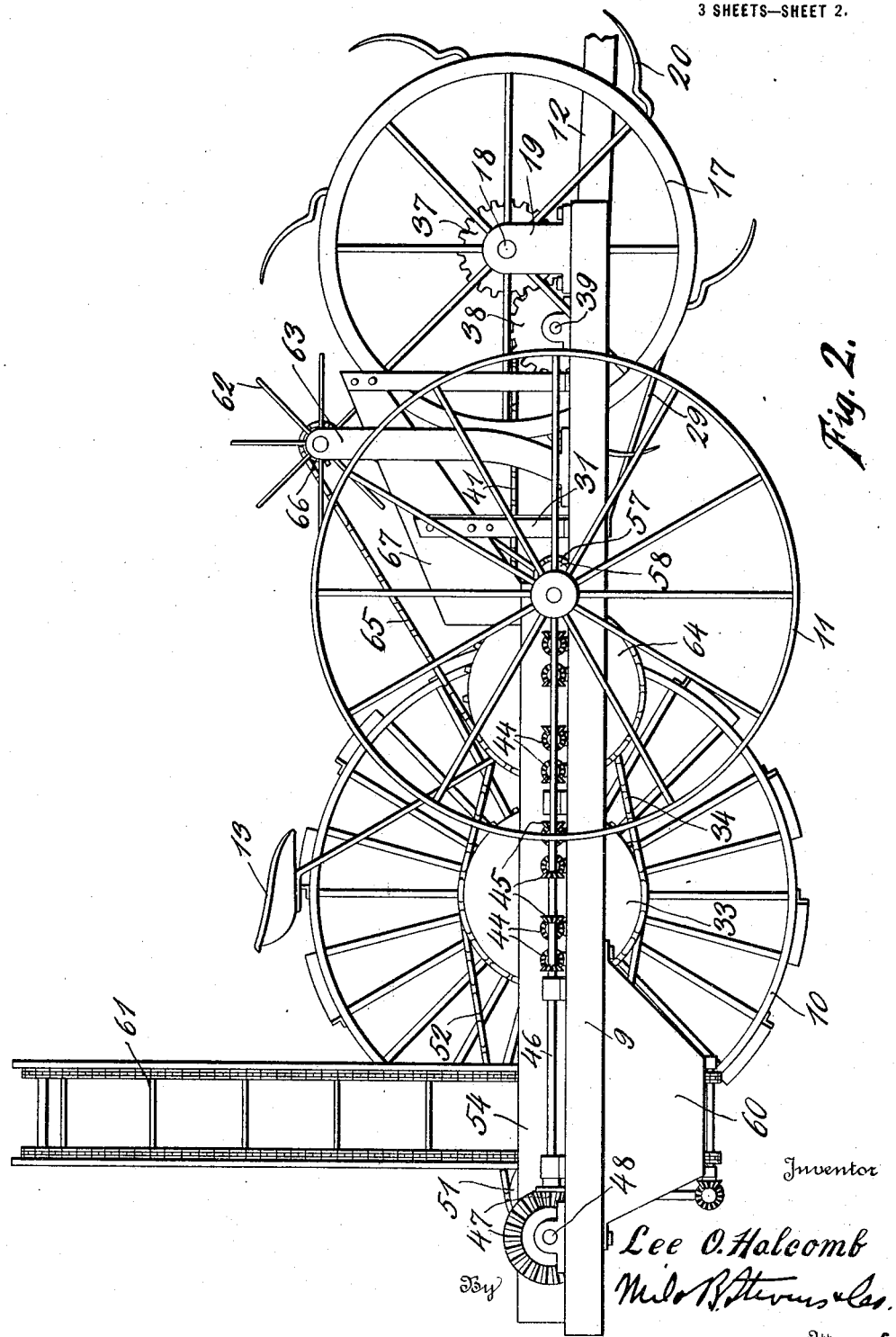

Figure 1 is a plan view of the machine; Fig. 2 is a side elevation thereof; Fig. 3 is an enlarged plan view of a fragment of the stripping mechanism; Fig. 4 is a cross-section on the line 4—4 of Fig. 3, and Fig. 5 is a sectional detail.

Referring specifically to the drawing, the frame 9 of the machine is suitably shaped to support the several working parts, and it is mounted on wheels 10 and 11 respectively, located on opposite sides. The wheel 10 is the drive wheel and in front thereof is located a tongue 12 for the draft animals, and to one side, a seat 13 for the driver. The drive wheel shaft 14 has a suitable clutch 15 for throwing the stripping mechanism and other parts into and out of gear. A suitable means is also provided for raising and lowering the machine according to the height of the stalks to be operated on, but the same need not be illustrated in detail or described as it is common in corn harvesters and well understood by those skilled in the art. A hand lever 16 is shown for controlling the height of the machine.

The mechanism for stripping the ears of the standing stalks comprises the following parts: At the front end of the machine is mounted a rotatable cylinder 17 set transversely and horizontally a suitable distance from the ground, and carried by a shaft 18 journaled in bearings 19 on the frame of the machine. The cylinder is armed on the outside with stripper fingers 20 curved in the direction of their length in the shape of a hook, and having a widened base portion 21 pivoted at one end to the cylinder, as indicated at 22. The opposite end of the base portion has an aperture 23 to take a guide stud 24 carried by the cylinder, and between the latter and the last-mentioned base portion is a small coiled spring 25. The spring presses the finger forward in the direction of its travel, and allows it to yield in the opposite direction. The fingers are set in uniformly spaced rows on the cylinder, and their outer ends and inner edges are sharp.

Alternating with the fingers 20, are husk tearing hooks 26 which are mounted on stationary bands 27 extending around the cylinder 17 in front. The upper ends 28 of the bands extend downward and rearward from the cylinder, and the lower ends 29 extend upward and rearward. The ends 28 are made fast to a cross-bar 30 carried by upstanding brackets 31 mounted on the frame of the machine, and the ends 29 are made fast to a cross bar 32 of said frame. The hooks 26 point downward, or in the opposite direction in which the fingers 20 point and they are also much smaller than the latter and set closer together. The hooks 26 do not extend entirely around the cylinder 17 but are located at the top and the front portion thereof only.

In operation, the cylinder 17 rotates in the opposite direction in which the wheels turn when the machine is traveling forward, and the fingers 20 therefore travel upward in front of the cylinder, and rearward at the top thereof. The length of the cylinder is such that the several rows of stalks are operated on. The machine is guided to carry the cylinder squarely against the rows of stalks, and when the fingers 20 engage the stalks, they cut the ears off the same. The ears, after they are cut off the stalks, are carried along over the cylinder by the fingers 20 and when they pass the hooks 26, the latter tear the husks to facilitate the removal of the same by the husking rollers. The cylinder 17 is driven from the wheel 10, the shaft 14 of the latter having a sprocket wheel 33 which is connected by a chain 34 to a sprocket wheel 35 on a countershaft 36. On one end of the cylinder shaft 18 is a pinion 37 which is in mesh with a pinion 38 on a short shaft 39 provided with a sprocket wheel 40 which is connected by a chain 41 to a sprocket wheel 42 on the countershaft 36. Thus, the motion of the drive wheel is transmitted to the cylinder and the latter turns in the proper direction when the machine is driven forward. To the rear of the ear-stripping cylinder 17 are mounted husking rollers 43 arranged in pairs as usual. The members of each pair of rollers have bevel gears 44 on one end meshing with bevel gears 45 on a shaft 46 which is geared by a bevel gearing 47 to a transverse shaft 48 at the rear end of the machine. The shaft 48 is connected by a spur gearing 49 to a countershaft 50 having a sprocket wheel 51 which is connected by a chain 52 to a sprocket wheel 53 on the drive shaft 14. Thus the shaft 14 drives the husking rollers. Along the ends of the husking rollers 43 extend shields 54 of a suitable height to prevent the ears from dropping off the rollers at the ends thereof, and between each pair of rollers is a guard plate 55 to prevent the ears from dropping down between the pairs of rollers. The husking rollers 43 are located between the upper and lower flights of a conveyer consisting of cross slats 56 carried at their ends on endless chains 57 trained over sprocket wheels 58. The sprocket wheels at the rear end of the conveyer are on the shaft 48, and the conveyer is therefore driven from said shaft. The front sprocket wheels are on a shaft 59. The upper flight of the conveyer carries the ears over the husking rollers toward the rear end of the series. At the rear end of the series of husking rollers is a hopper 60 into which the husked ears drop and from which they are taken up by an elevator 61 and carried into a wagon traveling alongside the machine. The elevator is of the usual slatted belt construction and is driven by a suitable gearing from the shaft 50. To assist the travel of the ears from the cylinder 17 to the husking rollers 43, there is mounted, slightly to the rear of the former, a reel 62 supported on standards 63, and driven from the shaft 36, the latter having a sprocket wheel 64 which is connected by a chain 65 to a sprocket wheel 66 on the reel shaft. The upper ends 28 of the bands 27 form a chute which carries the ears to the husking rollers 43, said ends extending rearward from the cylinder 17, with a downward inclination, and terminating at their lower ends close to the front set of rollers. At the sides of the chute formed by the parts 28 are upstanding guard plates 67 to prevent the ears from dropping off. The guard plates are supported by the brackets 31.

I claim:—

1. A corn harvester comprising a wheeled supporting frame, a transverse horizontal cylinder rotatably mounted at the front end of the supporting frame, ear-stripping fingers mounted on the cylinder, stationary husk-tearing hooks extending around the front and top portions of the cylinder and alternating with the stripping fingers, and means for rotating the cylinder.

2. A corn harvester comprising a wheeled supporting frame, a transverse horizontal cylinder rotatably mounted at the front end of the supporting frame, ear-stripping fingers mounted on the cylinder, stationary husk-tearing hooks extending around the front and top portions of the cylinder and alternating with the stripping fingers, and means for rotating the cylinder, the stripping fingers being curved in the direction of their travel, and the tearing hook being curved in the opposite direction.

3. A corn harvester comprising a wheeled supporting frame, a transverse horizontal cylinder rotatably mounted at the front end of the supporting frame, ear-stripping fingers mounted on the cylinder, husk-tearing hooks, stationary supports for said hooks extending around the front, top and bottom of the cylinder, and extending rearward therefrom and fastened to the supporting frame, said supports being located between the stripping fingers to locate the tearing hooks alternately with respect to the stripping fingers, and means for rotating the cylinder.

4. A corn harvester comprising a wheeled supporting frame, a transverse horizontal cylinder rotatably mounted at the front end of the supporting frame, ear-stripping fingers mounted on the cylinder, stationary husk-tearing hooks mounted adjacent to the stripping fingers, and means for rotating the cylinder.

5. A corn harvester comprising a wheeled supporting frame, a transverse horizontal cylinder rotatably mounted at the front end of the supporting frame, ear-stripping fingers mounted on the cylinder, stationary husk-tearing hooks mounted adjacent to the stripping fingers, and means for rotating the cylinder, the stripping fingers being curved in the direction of their travel, and the tearing hooks being curved in the opposite direction.

6. A corn harvester comprising a wheeled supporting frame, a transverse horizontal cylinder rotatably mounted at the front end of the supporting frame, ear-stripping fingers mounted on the cylinder, said fingers being pivoted and yieldingly supported, stationary husk-tearing hooks mounted adjacent to the stripping fingers, and means for rotating the cylinder.

In testimony whereof I affix my signature in presence of two witnesses.

LEE O. HALCOMB.

Witnesses:
 OMAR C. BOAZ,
 OSCAR E. HAMMERBECK.